L. SCOFIELD.
CORN-PLANTERS.

No. 194,004. Patented Aug. 7, 1877.

Witnesses.
Grenville Lewis.
M. Church.

Inventor
Levi Scofield
By Hill, Ellsworth & Shear
His Attys

UNITED STATES PATENT OFFICE.

LEVI SCOFIELD, OF GRAND HAVEN, MICHIGAN, ASSIGNOR OF ONE-HALF HIS RIGHT TO JUSTIN B. WAIT, OF SAME PLACE.

IMPROVEMENT IN CORN-PLANTERS.

Specification forming part of Letters Patent No. 194,004, dated August 7, 1877; application filed January 12, 1877.

*To all whom it may concern:*

Be it known that I, LEVI SCOFIELD, of Grand Haven, in the county of Ottawa and State of Michigan, have invented a new and useful Improvement in Corn-Planters; and I do hereby declare the following to be a full, clear, and exact description of the same, reference being had to the accompanying drawings, forming part of this specification.

My invention relates to corn-planters; and consists of an improvement in the connection between the seeding device, which improvement I proceed fully and particularly to set forth.

Figure 1:
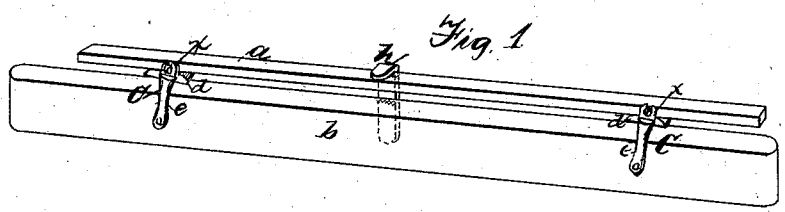
Figure 2:
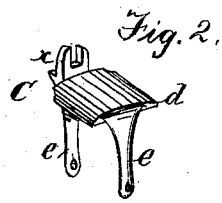

In Figure 1 of the drawing, $a$ represents a bar, which forms the connection between the two seeding mechanisms of a corn-planter, and by which simultaneous reciprocating or rotary movement is communicated to both. This bar is shown as supported on a larger bar, $b$, which represents the shank or runner-beam of a corn-planter. This connecting-bar (represented by $a$) is supported on the bar $b$ by means of rocking bearings C, which are pivoted on the lower bar, and support the upper or rounded faces. These bearings are made preferably as shown in Fig. 2. The bar $a$ rests immediately on the part $d$, which is provided with two equal arms, $e$ $e$, by which it is pivoted upon the bar or runner-beam $b$. The face of the part $d$ is curved on a circle, the center of which is the pivot on which the the bearing rocks. On one side of the part $d$, and rising sufficiently above, is a slotted stud, $x$.

Figure 3:
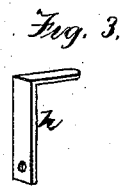

Two of these bearings are required to support the bar, which lies on the rounded faces and against the studs $x$. The bar is held to these by pins or screws passing through the slots into the bar, so that the two must move together as the bar reciprocates from side to side. The bar is held down upon the bearings by a suitable strip, a convenient form of which is shown at $h$, Figs. 1 and 3.

Prior to my invention it has been customary to mount the connecting-bar between the seeding mechanisms in fixed bearings, in which it was made to slide in frictional contact. These bearings were liable to become gummed and obstructed by dust mixed with the oil while working in the field, wore faster, and required much more force to move them than by this plan which I have described.

In my improvement the bar does not slide on the bearings, moves with no friction except the small amount in the pivoted bearings, requires little or no oil, and besides that it moves with perfect ease, and is not liable to clog.

As the friction is wholly on the pivoted bearings in the ends of the arms $e$ $e$, it is evident that the amount of resistance this will afford to the bar will depend upon the length of these arms. They should therefore be made as long as practicable in the kind of machine to which they are applied; but the face of the bearing should always be made in the arc of a circle struck from the pivoted bearings as a center. The bearings are, practically, segments of a wheel, and perform the office of a wheel, but are more convenient in application. Such as I have shown may be used with the same effect as a wheel of twelve or fourteen inches in diameter, and in space which would admit a wheel too small to fully accomplish the purpose.

I have not shown any particular form of seeding mechanisms, their nature not being essential, provided only they are such as require the connection of a reciprocating bar. Nor do I limit myself to the form of the bar or runner-beam to which the bearings are connected, that depending on the style of the machine.

It is also evident that the form of the bearings may be changed without departing from the spirit of my invention, provided a limited rocking support be retained, said support maintaining in the limits of its arc the bar always substantially in the same plane.

I claim as my invention—

1. A reciprocating connecting-bar between the seeding mechanisms of a corn-planter, in combination with rocking supports, as set forth.

2. A rocking bearing, C, combined with the reciprocating connecting-bar of a corn-planter, and having pivoted connections below and rounded supporting-surface for the bar, as set forth.

3. The pivoted bearing C, formed with an arm or arms $e$, slotted stud $x$, and rounded surface for the bar, as set forth.

4. The connecting-bar $a$ and segmental bearings C C, pivoted on the runner-beam or equivalent support, and held thereto by a strap, as set forth.

LEVI SCOFIELD.

Witnesses:
GEO. STICKNEY,
W. J. H. SAUNDERS.